March 20, 1956     J. M. FRANTZ     2,738,879
OIL FILTER CONVERSION KIT
Filed June 1, 1953
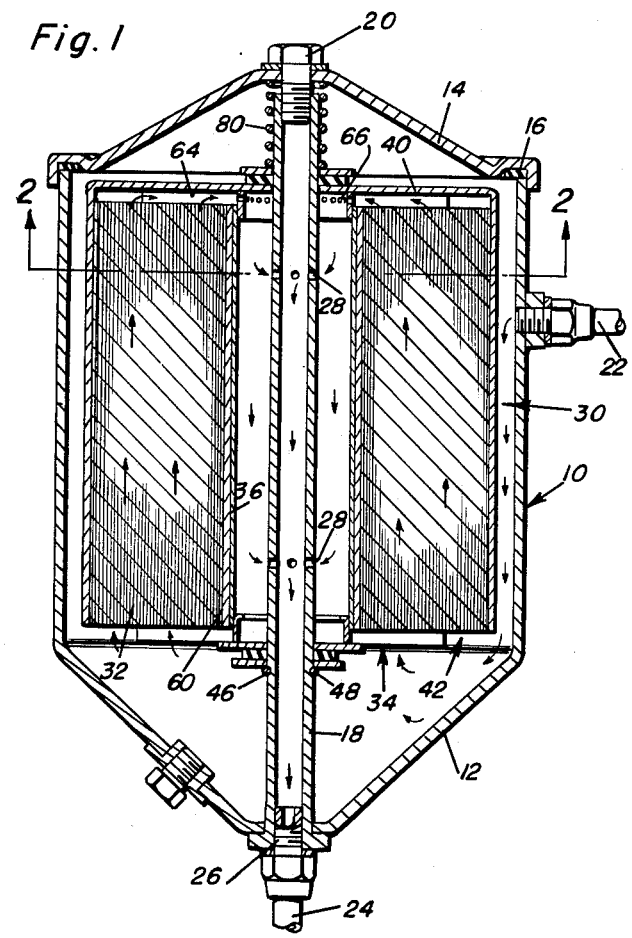
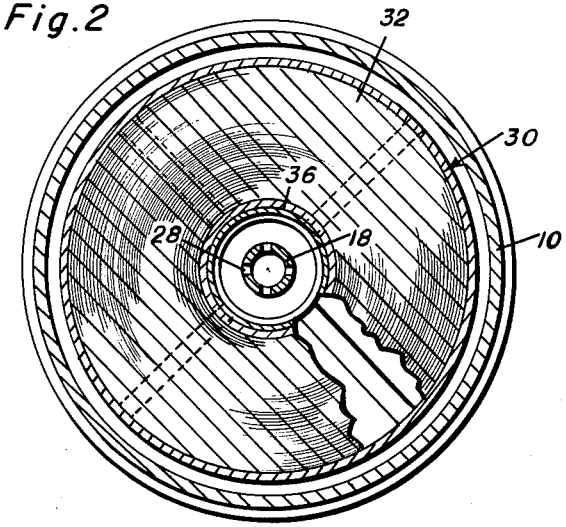
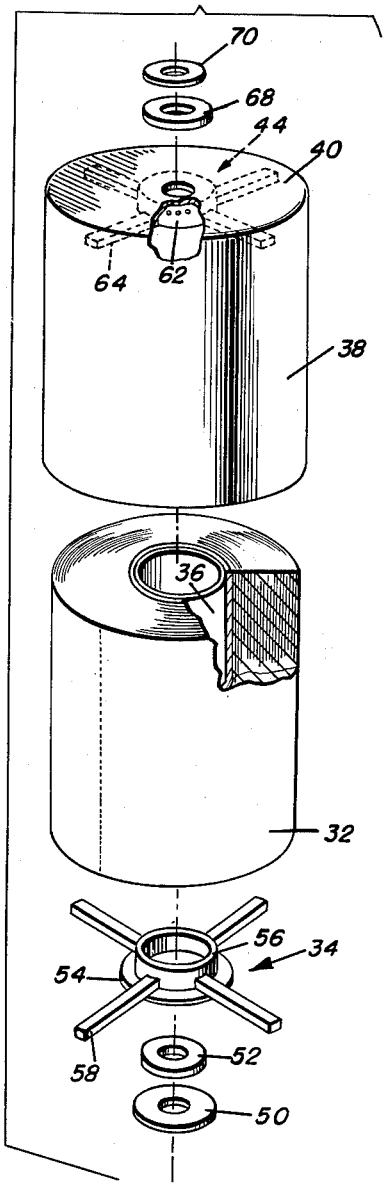
John M. Frantz
INVENTOR.

United States Patent Office 2,738,879
Patented Mar. 20, 1956

2,738,879

OIL FILTER CONVERSION KIT

John M. Frantz, Modesto, Calif.

Application June 1, 1953, Serial No. 358,600

2 Claims. (Cl. 210—183)

The present invention relates to oil filters for automotive vehicles and more particularly relates to an oil filter conversion assembly whereby a conventional oil filter unit may be adapted to receive replaceable filter cartridges in the form of toilet tissue rolls and the like.

Another object of the invention is to provide a filter mounting unit that may be readily inserted in a conventional filter container and which necessitates no tools or modification of the container for its emplacement therein.

These, together with various ancillary objects and features which will later become apparent as the following description proceeds are attained by the present invention, a preferred embodiment of which is shown by way of example only in the accompanying drawings, wherein:

Figure 1 is a side elevational view in section of the invention mounted within a conventional filter container;

Figure 2 is a cross-sectional view taken substantially along section line 2—2 of Figure 1; and Figure 3 is an exploded view of the filter cartridge mounting unit.

Referring now to the accompanying drawings in detail wherein like reference numerals designate like parts throughout the various views, attention is first directed to Figure 1 wherein is shown a conventional oil filter container 10 which comprises a substantially cylindrical shell having a cone-shaped lower end 12 and an upper end closed by a removable lid 14. Gasket 16 interposed between the upper edge of the shell 10 and the base of the lid 14 provides a seal to prevent escape of oil from the container at this point.

Extending axially through the container 10 is a tube 18 the lower end of which opens into the apex 12 of the container 10 and the upper end of which opens into the lid 14. The inner surface of the tube wall is threaded at its upper end and the threaded fastener 20 forms a plug for the upper end of this tube as well as a clamping bolt for maintaining the lid 14 in position.

The side wall of the cylindrical shell 10 has an oil bypass line 22 opening thereinto while an oil return line 24 has a nipple 26 threaded into the lower end of the tube 18. Intermediate the ends of the tube 18, the side walls of this tube are formed with apertures or openings 28.

Oil is pumped through the by-pass line 22 into the container 10 through the apertures 28 and out through the return line 24 opening into the bottom of the tube 18. A filter mounting unit 30 is mounted on the tube 18 to filter the oil prior to its entrance into the tube through the apertures 28. It is this filter mounting unit which constitutes the present invention.

The filter mounting unit 30 is constructed in such a manner that it is enabled to utilize an ordinary roll of toilet tissue 32 as the refill cartridge for the same. With this mounting, an extremely cheap, easily replaceable filter cartridge is provided that is almost universally available and which may be purchased at grocery stores and the like.

The operative parts of the filter mounting unit 30 are shown clearly in Figures 1 and 3. These parts consist generally of the lower supporting structure or spider 34 which is mounted on the tube 18 adjacent the lower end thereof and below the side wall apertures 28 in the tube. A sleeve 36 concentrically surrounds the tube 18 and seats on the supporting structure 34. A cylindrical casing 38 having a closed upper end or end wall 40 and an open lower end 42 is received over the tube 18 and a spider 44 mounted on the inner surface of the end wall 40 seats against the upper end of the tube 36. As will be noted in Figure 1, the spider 44 forms a spacing means for spacing the end wall 40 of the casing 38 from the upper end of the sleeve 36. The open lower end of the casing 38 terminates adjacent the spider 34 which forms the supporting structure.

To mount the unit 30 within the container, the lower portion of the tube 18 is formed with an annular recess 46 within which a split ring 48 is seated.

Seated on the ring 48 is a suitable washer 50 and seated on the washer 50 is a sealing washer 52. The spider 34 comprises a ring 54 which seats upon the sealing washer 52 and on which is mounted a collar 56 forming the hub of the spider. Radial arms 58 extend from the hub 56 adjacent its junction to the ring 54. The upper portion of the hub or collar 56 telescopes within the lower end of the sleeve 36 to maintain this end of the sleeve in its concentrically spaced relation with the tube 18. The filter cartridge 32 seats on the arms 58 of the spider 34 and the hollow core 60 of the filter cartridge is received over the sleeve 36. The cylinder wall of the casing 38 surrounds the roll of tissue 32 and the upper end wall 40 of the casing 38 encloses the upper end of the roll of tissue.

The spider 44 mounted on the inner surface of the end wall 40 of the casing is formed substantially in the same manner as the spider 34 and consists of a hub member or collar 62 welded or otherwise secured to the inner surface of the end wall 40 and concentrically surrounding the tube 18. Radially extending arms 64 project from the collar 62 and space the upper end of the tissue roll 32 from the end wall 40. The hub or collar 62 telescopes within the upper end of the sleeve 36 to maintain this end in concentric spaced relation with the tube 18. Also, a plurality of apertures are arranged circumferentially around the collar 62 as designated at 66 which open into the space between the end wall 40 and the upper edges of the tissue roll 32.

Sealing washer 68 is received over the tube 18 and seats against the central portion of the wall 40 wherein the tube 18 passes through this wall. A suitable washer 70 seats on the other surface of the washer 68 and coil spring 80 is disposed over the upper end of the tube 18 to react against the lid 14 and the end wall 40 of the casing 38 to retain the filter mounting unit 30 against movement on the tube 18.

With this arrangement, as the oil enters the container through the by-pass line 22, it must travel downwardly toward the base of the casing and enter the roll of toilet tissue at the bottom thereof so that the oil must flow upwardly through the tissue parallel with the tissue rather than through the side walls of the tissue. This has two primary advantages over the present manner of filtration in that the heavier sludge particles are initially deposited in the reservoir formed by the cone-shaped lower end of the container and the oil flows through the tissue more easily parallel thereto than transverse thereto. As the oil permeates through the tissue, it enters into the space between the end wall 40 and the upper edge of the tissue and thence through the apertures 66 to the space between the sleeve 36 and the tube 18 and thence through the apertures 28 in the side wall of the tube 18 from whence it is returned to the crankcase via the return line 24.

From the foregoing description, the construction and operation of the unit will be readily understood and fur-

What is claimed as new is as follows:

1. In an oil filtering container having an oil discharge tube extending axially therethrough with side wall openings therein, a conversion assembly for mounting a roll of absorbent tissue in said container as a filtering medium, said assembly comprising a washer fixedly secured to said tube adjacent and above the lower end thereof, a spider having a central hub supported by said washer and arms extending radially therefrom for supporting a roll of tissue, said hub extending above said arms, a sleeve having its lower end telescoped over said hub and being retained in concentric spaced relation to said discharge tube thereby, said sleeve being adapted to receive a roll of tissue thereon, a casing adapted to encase a roll of tissue surrounding said sleeve and having a closed upper end and an open lower end, a bushing projecting downwardly from the undersurface of said closed upper end received in the upper end of said sleeve and radial fingers projecting from said bushing limiting the penetration of said bushing into said sleeve and for spacing the upper end of a roll of tissue disposed in the casing from the upper end of the casing, said bushing having apertures therein between said fingers for admitting oil into the annular space between said tube and said sleeve.

2. In an oil filtering container having an oil discharge tube extending axially therethrough with side wall openings therein, a conversion assembly for mounting a roll of absorbent tissue in said container as a filtering medium, said assembly comprising a supporting structure for supporting a roll of tissue carried by said tube below the side wall openings thereof, said supporting structure having openings therethrough and including a central hub received in said tube, a sleeve concentrically surrounding said tube and having the lower end thereof attached to said hub, said sleeve being adapted to receive a roll of tissue thereon, a casing adapted to encase a roll of tissue surrounding said sleeve and having a closed upper end and an open lower end, a bushing projecting downwardly from the undersurface of said closed upper end and received in the upper end of said sleeve, means depending from the undersurface of said closed upper end for limiting the penetration of said bushing into said sleeve, and for spacing a roll of tissue from said closed upper end, said bushing having apertures therein above said sleeve for admitting oil into the annular space between said tube and said sleeve.

References Cited in the file of this patent

UNITED STATES PATENTS

| | | |
|---|---|---|
| 1,753,809 | Short | Apr. 8, 1930 |
| 1,761,963 | Babitch | June 3, 1930 |
| 2,511,800 | Wilkinson | June 13, 1950 |
| 2,547,857 | Cook | Apr. 3, 1951 |
| 2,661,846 | Lash et al. | Dec. 8, 1953 |
| 2,692,683 | Mason | Oct. 26, 1954 |